Figure 1:
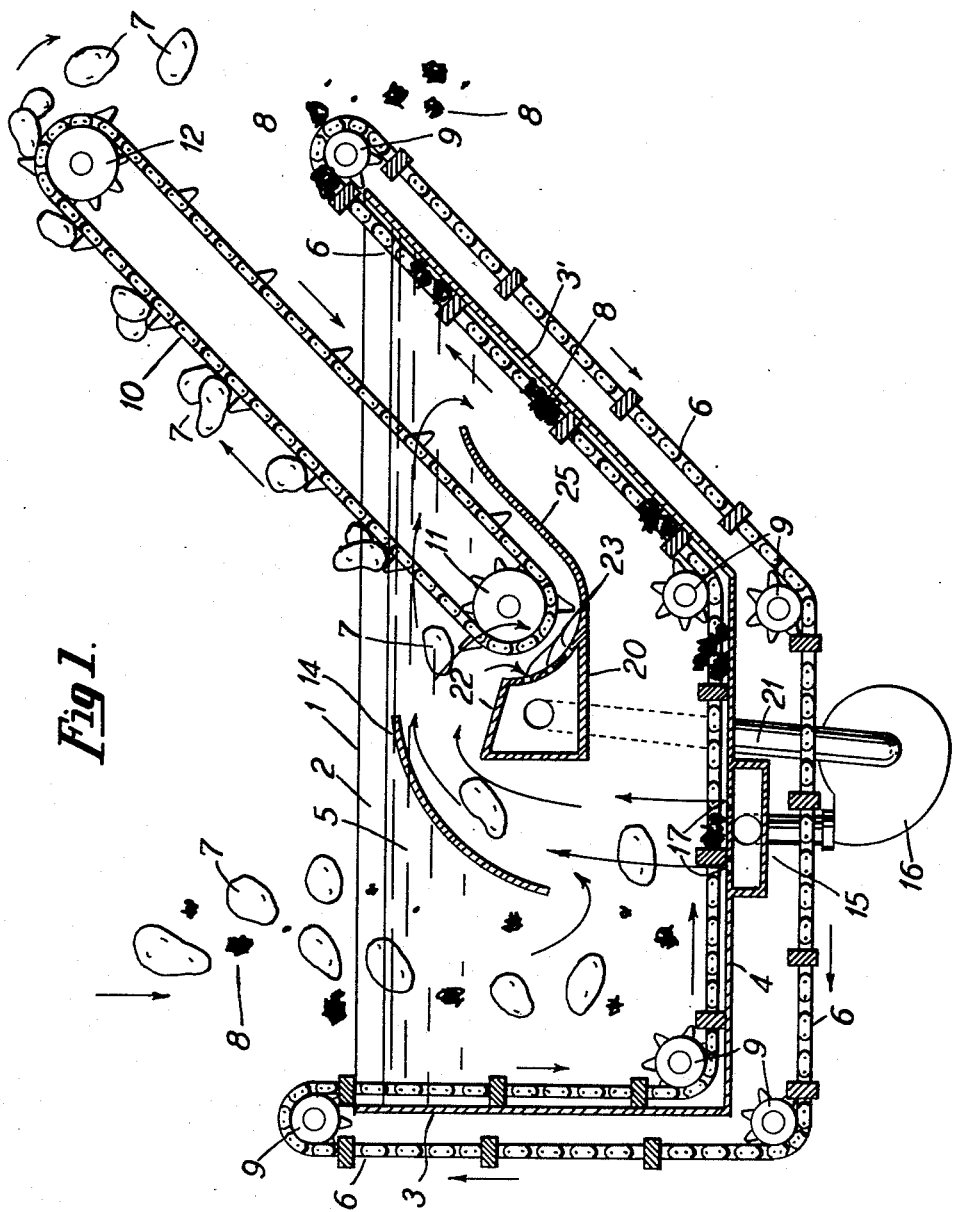

Dec. 28, 1954   D. L. CALL ET AL   2,698,087
FLOTATION SEPARATION TANK
Filed Dec. 8, 1953

DAVID L. CALL
WILLIAM I. TUCKER, JR.   INVENTORS

BY

United States Patent Office 2,698,087
Patented Dec. 28, 1954

2,698,087

FLOTATION SEPARATION TANK

David L. Call and William I. Tucker, Jr., Ithaca, N. Y.

Application December 8, 1953, Serial No. 396,958

5 Claims. (Cl. 209—158)

This invention relates to the harvesting of potatoes, and particularly to the separation of newly dug potatoes from the stones and detritus which are generally brought up with the potatoes by the digging machines used in large scale operations. Machines are now available for rapidly digging potatoes with the aid of tractors or other motive power, and are generally provided with shaking screens or other devices which allow most of the soil to fall back on the ground. However, larger stones and clods about the size of potatoes tend to remain with the potatoes, necessitating hand picking or further mechanical separation.

Some separators have been made of the flotation tank type, based on the principle of an upward current of water sufficient to lift potatoes but not strong enough to lift the stones and other heavy matter, so that the potatoes can be carried off by an upper conveyor while the heavier material sinks down thru the water to a lower conveyor. The present invention is an improvement on these flotation type separators, and has for its principal objects an improvement in the flow streams so that the water, potatoes and debris are carried thru their respective courses more quickly and directly than in the past, in order to reduce the bulk, cost and complexity which have been the chief objections to such separators in previous constructions. This type of separator does not need to use brine or liquids of different specific gravities to effect a separation, since the action is principally due to the velocity of the fluid rather than mere density.

Another object of this invention is to prevent undue abrasion or damage to the potatoes in their transit thru the machine, particularly at the points where the separated potatoes are picked up by the outgoing conveyor. Various other objects will appear as the description proceeds.

In the present invention the stones and heavy material, together with the potatoes, are first deposited with considerable downward momentum directly to the bottom where the primary waste conveyor is located, so that the stones and other heavy objects do not have to take time to gravitate down thru a rising water current, but simply remain as initially deposited in the waste discharge conveyor. The water jets making the rising flotation current only work to lift the potatoes, and do not have to oppose the sinking stones. This increases the effectiveness of the machine, reduces the amount of water required, and simplifies the structure.

The water flow is also improved by drawing much of it back with a quick turn just as the potatoes are being delivered to the outgoing potato conveyor, making a shorter pump circuit for the potato separation flotation while leaving a gentle current to carry the potatoes on to their outgoing conveyor. This gentle current sufficiently accords with the speed and direction of the conveyor so that the potatoes are picked up without undue shock or abrasion.

Since water is rather heavy, and is the principal weight element in such devices, as well as troublesome to obtain in some areas, anything that reduces the amount of water required or uses it more effectively is desirable in such mechanisms.

Referring now to the drawing forming part of this specification, Fig. 1 is a side elevation principally in cross-section, illustrating the mechanism and hydraulic flow by which the potatoes dumped into the machine are quickly separated from the stones and heavy detritus, and the objects thus separated are delivered to their respective places.

As shown in the drawing, the separating device comprises a tank 1 having the side walls 2, vertical end wall 3, sloping end wall 3', and bottom 4. This tank 1 is filled with water 5 as shown. In and around this water tank 1 is a primary continuous conveyor 6 of any suitable type, such as belt, screw, or chain, for carrying the potatoes 7 and stones 8 along the bottom of the tank, and for carrying the stones 8 out. For example, there is shown in Fig. 1 a chain belt conveyor 6 mounted on pulleys or sprockets 9 which lead the conveyor belt 6 directly down into the water at the left hand wall 3 of the tank 1, then across the bottom 4 and up thru the water along the sloping right hand wall 3' of the tank, and then out into the air where the stones 8 are dumped—the belt 6 then continuing around outside and under the tank to the places where it plunges into the water again.

A second conveyor 10 is mounted above the conveyor 6 on sprockets or pulley wheels 11 and 12, the wheel 11 being below the water level so that one end of the conveyor 10 dips into the water. The upper run of this secondary conveyor carries the potatoes 7 out. The conveyors 6 and 10 are driven by any suitable motor or transmission as is common in such conveyors, such motive elements being well known to those skilled in the art, and so are not illustrated in order that the drawing may more clearly show the particular features in which the novelty of the present invention resides. The term conveyor will be understood to include all its normal driving parts.

A curved or sloping baffle plate 14 is submerged in the water and extends between the side walls 2, helping to strengthen them but principally for the purpose of directing the incoming potatoes and stones to the bottom of the tank and on the other side guide the rising potatoes toward the conveyor 10, as will be described. The water on the left of the baffle 14 tends to have a downward current, since there are no uprising jets under it. Some of the water flows back to the left around the top of the baffle 14 to help supply such downward current. Below the baffle plate 14 and under the conveyor 6 at the bottom of the tank is a water jet box 15 receiving water under pressure from the pump 16, which water enters the tank thru the orifices 17 and produces an upward current flowing up under the baffle 14 and then to the right toward the conveyor 10, as shown by the arrows.

The separation of the potatoes from the stones is effectuated by this upward current of water in the following manner. It will be noted that the mixture of potatoes and stones is first allowed to fall with considerable velocity downward into the water directly to the bottom of the tank, since they are dumped in to the left of the baffle 14 which with the adjacent walls forms an intake channel where the movement of the water is if anything generally downward. Thus the stones, as well as most of the potatoes, reach the bottom part of the tank quickly without having to contend against an upward rising current. In other words, the stones are promptly placed on the lower conveyor belt 6 where they remain until carried out, and do not have to fall thru rising water as would be the case if they were initially injected along with the potatoes into a rising stream. However, when the potatoes mingled with the stones pass over the orifices 17 of the water jet duct 15 the upward current is sufficiently strong to lift the potatoes but not affect the stones.

The potatoes are then separated from the stones and are carried upward and to the right under the sloping baffle 14 and over a hollow box or tube 20 which, like the baffle, extends across the tank between the side walls 2. This hollow box 20 has a special construction for the purpose of guiding the potatoes to the conveyor 10, and diminishing the speed of flow so that the conveyor will pick them up gently without harmful impact by withdrawing part of the circulating water down thru the pipe 21 directly to the inlet of the circulating pump 16.

To provide this action, the hollow box 20 has an upper face 22 which together with the baffle 14 forms a channel thru which the potatoes flow to the right. They move thru that with considerable speed and agitation. However, the side of the hollow box 20 next to the conveyor 10 (where it goes around the wheel 11), is provided with water intake holes 23 which draw off a large portion of the water directly thru the pipe 21 to the pump 16, so that it is quickly recirculated. This reduces the speed of flow of the water beyond the point 23 to a moderate current which gently lays the potatoes on the conveyor 10 and then goes on thru the openings in the conveyor and down under the baffle 25. This slower current of the water then flows down and to the left until it again meets the upward flotation jets coming from the orifices 17 of the water pressure box 15, which accelerate the current upward again to separate the incoming potatoes from the stones.

The quick turn given the water when it enters the holes 23 of the suction box 20 tends to assist in clarifying it by centrifugal action; and this, together with the fact that the teeth or projecting portions of the conveyor 10 continually scrape across the holes 23 keeps the holes open and prevents debris from accumulating there. The fact that much of the water is transferred at high speed thru the pump by-pass pipe 21 makes it possible to use a lesser volume of water and so lighten the machine.

The apparatus described may be either used in connection with a stationary installation, or it may be mounted on the digger machine to travel over the fields with it, thus dispensing with the laborious manual separating of stones now required with some harvesters.

While we have in the foregoing described certain specific forms by way of example, it will be understood that they are merely for the purpose of illustration to make clear the principles of the invention, which is not limited to the particular forms shown, but is susceptible to various modifications and adaptations in different installations as will be apparent to those skilled in the art without departing from the scope of the invention as stated in the following claims.

We claim:

1. In a flotation tank mechanism for the separation of potatoes from stones, the combination of a water tank having side walls, end walls and a bottom, a primary conveyor in the water along the bottom of the tank for conveying stones out of the tank, said tank having an intake channel where the downward travel of the stones and potatoes dumped therein insures the prompt descent of the stones to said primary conveyor, a water jet duct having orifices under a portion of said primary conveyor to cause an upward current of water thru said conveyor of such strength as to carry the potatoes up yet not lift the stones and thus separate them, a secondary conveyor above the primary conveyor having one end in the water to pick up and carry out the separated potatoes, a water intake near the pick up end of said secondary conveyor, a pump connected to said intake, said pump supplying the water jet duct with water under pressure, the remainder of the water circulating in the tank under lower velocity and pressure as principally stimulated by the higher pressure flow from the orifices of the water jet duct.

2. In a flotation tank mechanism for the separation of potatoes from stones, the combination of a water tank having side walls, end walls and a bottom, a primary conveyor in the water along the bottom of the tank for conveying stones out of the tank, said tank having an intake channel where the downward travel of the stones and potatoes dumped therein insures the prompt descent of the stones to said primary conveyor, a water jet duct having orifices under a portion of said primary conveyor to cause an upward current of water thru said conveyor of such strength as to carry the potatoes up yet not lift the stones and thus separate them, a secondary conveyor above the primary conveyor having one end in the water to pick up and carry out the separated potatoes, a water intake near the pick up end of said secondary conveyor, said intake being on the side toward the secondary conveyor so as to cause a quick reversal of flow on the part of the water entering said intake whereby the potatoes are detached from the more rapid current and are carried more gently on to the secondary conveyor, a pump connected to said intake, said pump supplying the water jet duct with water under pressure, the remainder of the water circulating in the tank under lower velocity and pressure as principally stimulated by the higher pressure flow from the orifices of the water jet duct.

3. In a flotation tank mechanism for the separation of potatoes from stones, the combination of a water tank having side walls, end walls and a bottom, a primary conveyor in the water along the bottom of the tank for conveying stones out of the tank, said tank having an intake channel where the downward travel of the stones and potatoes dumped therein insures the prompt descent of the stones to said primary conveyor, a water jet duct having orifices under a portion of said primary conveyor to cause an upward current of water thru said conveyor of such strength as to carry the potatoes up yet not lift the stones and thus separate them, a secondary conveyor above the primary conveyor having one end in the water to pick up and carry out the separated potatoes, a water intake near the pick up end of said secondary conveyor, said intake being on the side toward the secondary conveyor so as to cause a quick reversal of flow on the part of the water entering said intake whereby the potatoes are detached from the more rapid current and are carried more gently on to the secondary conveyor, said secondary conveyor having projecting portions which sweep over said water intake to prevent its being clogged by debris, a pump connected to said intake, said pump supplying the water jet duct with water under pressure, the remainder of the water circulating in the tank under lower velocity and pressure as principally stimulated by the higher pressure flow from the orifices of the water jet duct.

4. In a flotation tank mechanism for the separation of potatoes from stones, the combination of a water tank having side walls, end walls and a bottom, a primary conveyor in the water along the bottom of the tank for conveying stones out of the tank, said tank having an intake channel where the downward travel of the stones and potatoes dumped therein insures the prompt descent of the stones to said primary conveyor, a water jet duct having orifices under a portion of said primary conveyor to cause an upward current of water thru said conveyor of such strength as to carry the potatoes up yet not lift the stones and thus separate them, a sloping baffle plate for directing the upward moving potatoes laterally in the upper part of the tank away from the intake channel, a secondary conveyor above the primary conveyor having one end in the water to pick up and carry out the separated potatoes, a water intake near the pick up end of said secondary conveyor, a pump connected to said intake, said pump supplying the water jet duct with water under pressure, the remainder of the water circulating in the tank under lower velocity and pressure as principally stimulated by the higher pressure flow from the orifices of the water jet duct.

5. In a flotation tank mechanism for the separation of potatoes from stones, the combination of a water tank having side walls, end walls and a bottom, a primary conveyor in the water along the bottom of the tank for conveying stones out of the tank, said tank having an intake channel where the downward travel of the stones and potatoes dumped therein insures the prompt descent of the stones to said primary conveyor, a water jet duct having orifices under a portion of said primary conveyor to cause an upward current of water thru said conveyor of such strength as to carry the potatoes up yet not lift the stones and thus separate them, a sloping baffle plate for directing the upward moving potatoes laterally in the upper part of the tank away from the intake channel, said sloping baffle being submerged enough to allow a minor portion of said upward water to flow back and down the intake channel of the tank, a secondary conveyor above the primary conveyor having one end in the water to pick up and carry out the separated potatoes, a water intake near the pick up end of said secondary conveyor, a pump connected to said intake, said pump supplying the water jet duct with water under pressure, the remainder of the water circulating in the tank under lower velocity and pressure as principally stimulated by the higher pressure flow from the orifices of the water jet duct.

References Cited in the file of this patent

UNITED STATES PATENTS

| Number | Name | Date |
|---|---|---|
| 1,048,767 | Twedt | Dec. 31, 1912 |
| 2,578,808 | Johnson et al. | Dec. 18, 1951 |
| 2,626,051 | Innes et al. | Jan. 20, 1953 |

FOREIGN PATENTS

| Number | Country | Date |
|---|---|---|
| 267,349 | Italy | Sept. 3, 1929 |
| 451,402 | Great Britain | Aug. 5, 1936 |